July 10, 1951   J. THOMPSON   2,559,806
THREADED JUNCTURE AND PROCESS OF MAKING THEM
Filed Oct. 17, 1945   5 Sheets-Sheet 1

INVENTOR.
John Thompson
BY Harry R. Canfield
ATTORNEY

INVENTOR.
John Thompson
BY Harry P. Canfield
ATTORNEY

July 10, 1951 J. THOMPSON 2,559,806
THREADED JUNCTURE AND PROCESS OF MAKING THEM
Filed Oct. 17, 1945 5 Sheets-Sheet 3

INVENTOR.
John Thompson
BY Harry R. Canfield

ATTORNEY

July 10, 1951
J. THOMPSON
2,559,806
THREADED JUNCTURE AND PROCESS OF MAKING THEM
Filed Oct. 17, 1945
5 Sheets-Sheet 4
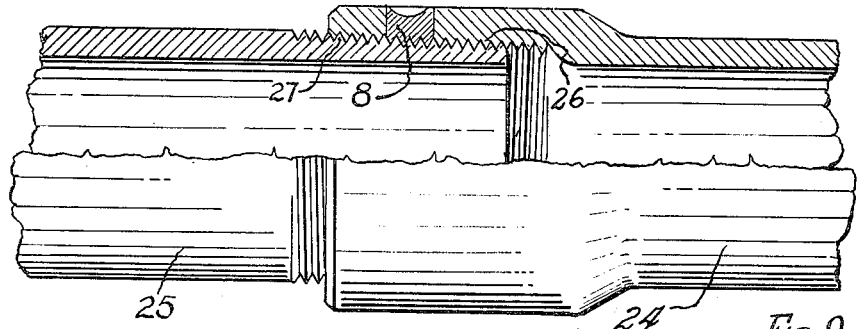
Fig. 9
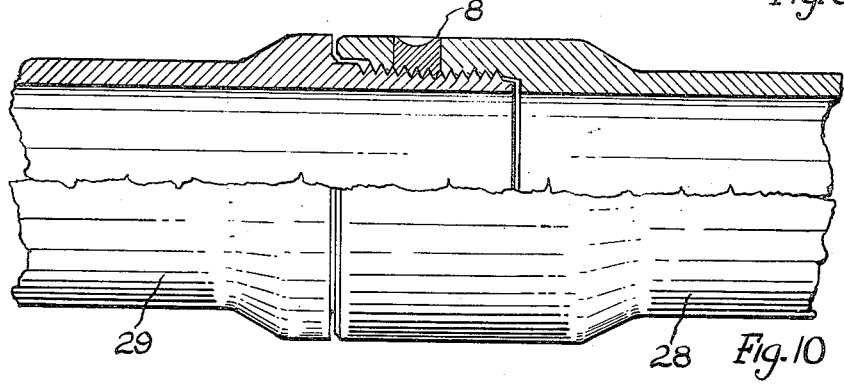
Fig. 10
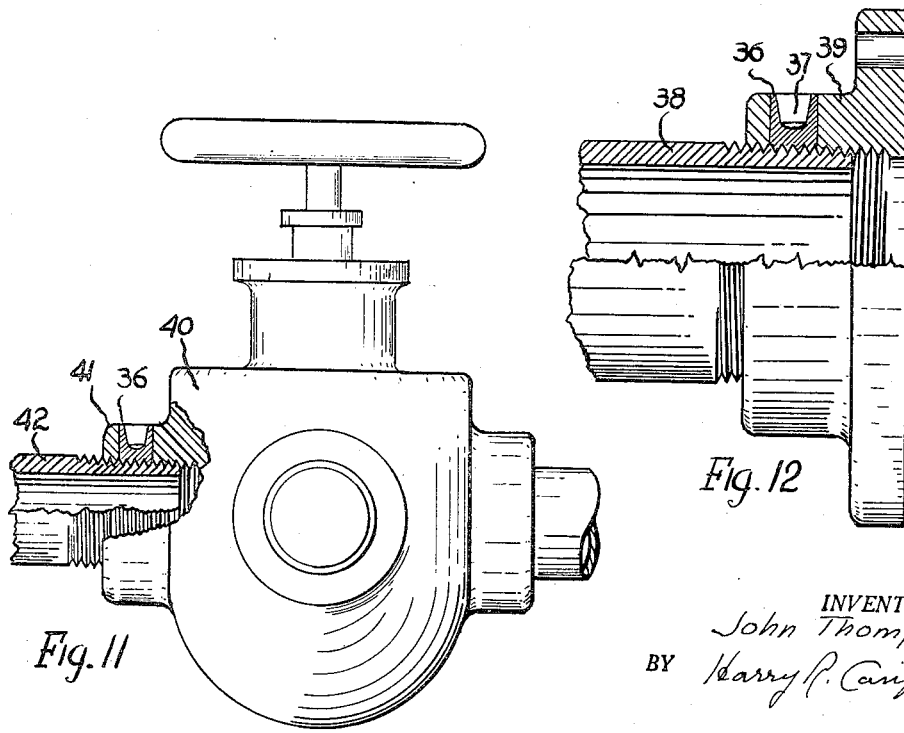
Fig. 11
Fig. 12
INVENTOR.
John Thompson
BY Harry R. Canfield
ATTORNEY July 10, 1951  J. THOMPSON  2,559,806
THREADED JUNCTURE AND PROCESS OF MAKING THEM
Filed Oct. 17, 1945  5 Sheets-Sheet 5

INVENTOR.
John Thompson
BY Harry P. Canfield
ATTORNEY

Patented July 10, 1951

2,559,806

UNITED STATES PATENT OFFICE 2,559,806

THREADED JUNCTURE AND PROCESS OF MAKING IT

John Thompson, Cleveland, Ohio

Application October 17, 1945, Serial No. 622,892

4 Claims. (Cl. 285—157)

This invention relates to threaded joints, couplings, connections and the like, by which parts are joined together, and to methods and means for making the threaded juncture leak-proof, when subjected to fluid pressure.

The invention has particular application to pipe joints in which the threads are conical, but as will become apparent hereinafter the invention may be practiced with advantages in joints other than pipe joints and in joints in which the threads are cylindrical; but in order to simplify the disclosure of the invention herein it will be described more particularly as applied to pipe joints.

In any kind or type of threaded pipe joint, whether it be a coupling-joint, joining two pipes together, or a joint between a pipe and a pipe flange or a valve housing, or other structural part, the threads themselves will inevitably provide a spiral or helical leakage passageway from the interior to the exterior of the pipe, when one end or the other of the thread is subjected to fluid pressure, unless the mating threads when mutually meshed fit each other perfectly and completely along their flanks and also at the tips and at the roots of the thread; and it is beyond the limits of practicability to make such perfectly mating threads.

It is possible and practicable to make threads that fit each other accurately along one or both flanks of the thread; but not at the same time at their roots and tips. Even in the most accurately made threads therefore, there is a spiral leakage path as aforesaid between the tip of one thread and the root of its mate, even when the threads are conical pipe threads and even when they are screwed tightly together.

When the interior of the pipe is under a small degree of pressure up to, say 200 to 300 pounds per square inch, this spiral leakage path can be blocked off and sealed by a plastic compound such for example as plumber's red lead or a lubricant containing finely ground solids, applied upon the threads before they are screwed together; but there are many uses of pipes, tubular casings, etc., for example in the oil fields and at oil wells, and in refineries, processes, etc., where gas, oil, and other fluids are conducted or contained in pipes or tubes at pressures so great that it will blow out or wash out such filling or blocking material from the spiral passageway, and develop leaks.

Various means have been proposed to solve this problem. For example it has been proposed to provide transverse shoulders or cones on the joined parts which are to be drawn tight together by the threads when the parts are screwed together; but this requires (particularly when conical threads and their advantages are wanted) that the conical threads and the shoulders shall both come tight at the same time; and this makes necessary such a high degree of accuracy as to be economically impracticable, because of the cost involved in special machinery and tools, precision machine work, and highly skilled labor.

In some classes of pipe joints an additional problem is presented by the necessity of testing the joint for leaks at the plant where the parts are manufactured. The parts must be screwed together, tested for pressure leaks, and then unscrewed or disassembled for shipment to the point of use; and there, when reassembled, must again go together in leakproof condition. Some of the means hitherto proposed for leakproofing the joint are not adapted to be utilized in this manner.

The present invention has been made to solve this problem. The actual invention and its scope are set forth in the appended claims; but it may be described briefly as a process for providing a recess or walled aperture in one of the two parts to be threaded together, and which recess or aperture is open at the thread on that part, and filling the aperture or recess with an insert of ductile metal or solidified fusible metal, or other solid material, conforming generally to the thread on the other part, and then molding the insert by pressure into intimate sealing contact with the thread on the other part, using the latter as a mold; whereby, some of the convolutions of the thread of the said one part are on the insert; and whereby the portion of the thread on the insert and a corresponding portion of the thread on the said other part do fit each other completely and perfectly, and the said spiral passageway is blocked off.

And the invention besides the said process comprises a joint so made; and comprises the parts or a part from which it is or may be made.

The objects of the invention therefore are:

To provide generally an improved pressure-leakproof threaded juncture between parts;

To provide a threaded juncture between parts in which solid metal or other material in the form of an insert on at least one of the parts is pressure-molded upon the thread of the other part, into complete profile sealing contact with 2,559,806

3 it, in a manner to block off the spiral passageway around the threads caused by incomplete meshing engagement of the original threads;

To provide a part or parts from which such a juncture can be made;

To provide a process for making such a juncture;

Other objects will be apparent to those skilled in the art to which the invention appertains.

The invention is fully disclosed in various forms and modifications thereof, in the following description taken in connection with the accompanying drawing, in which:

Figs. 9 and 10 are views illustrating respectively modifications of the embodiment of Fig. 1 and in which two pipes, casings, or the like are joined together by screwing one upon the other;

Fig. 11 illustrates the application of my invention to the threaded juncture between a pipe and a valve housing;

Fig. 12 illustrates my invention applied to the juncture between a pipe and a pipe flange;

Figure 1:
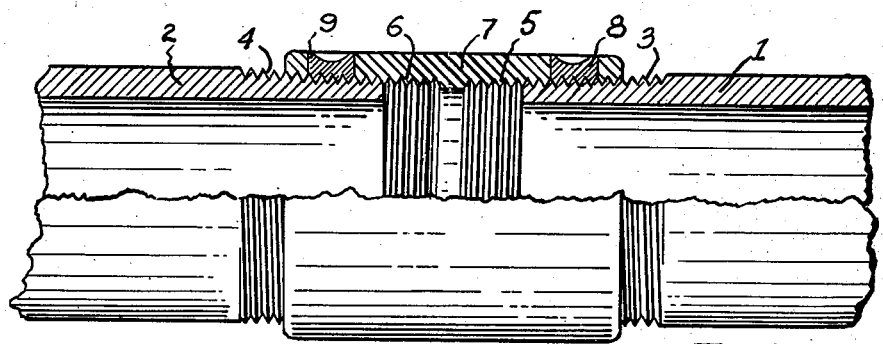
Fig. 1 is a longitudinal sectional view illustrating an embodiment of my invention in a threaded juncture of the type in which two pipes, tubes, casings, or the like are joined together by a coupling.
Figure 8:
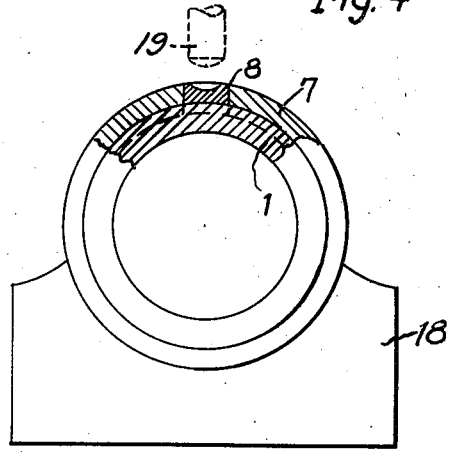
Fig. 8 is a view illustrating diagrammatically an apparatus which may be used in performing the process step illustrated in Fig. 7.
Figure 18:
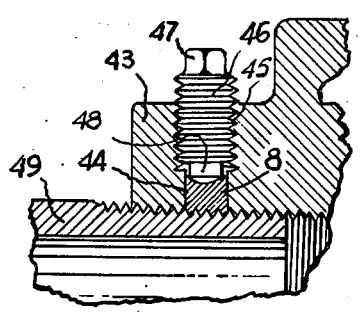
Figures 19, 20:
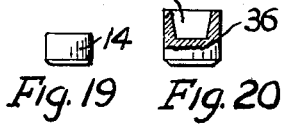
Figure 6:
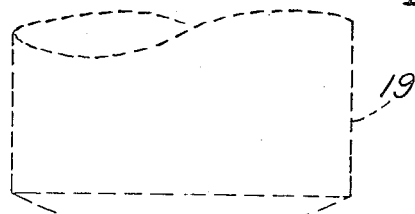
Figure 6:
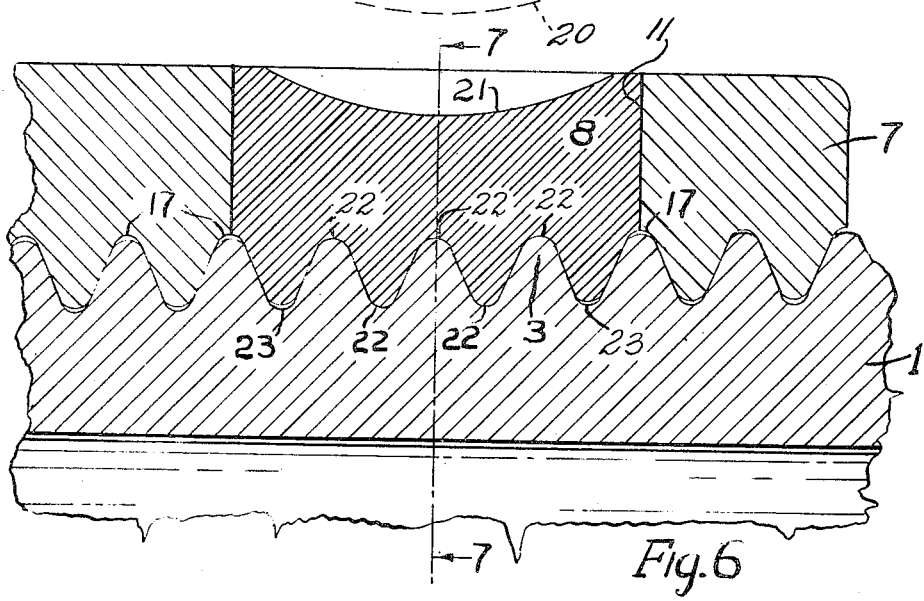
Figure 15:
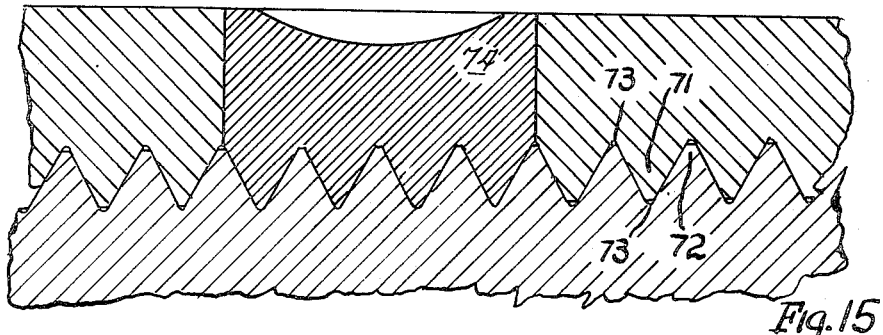
Figure 16:
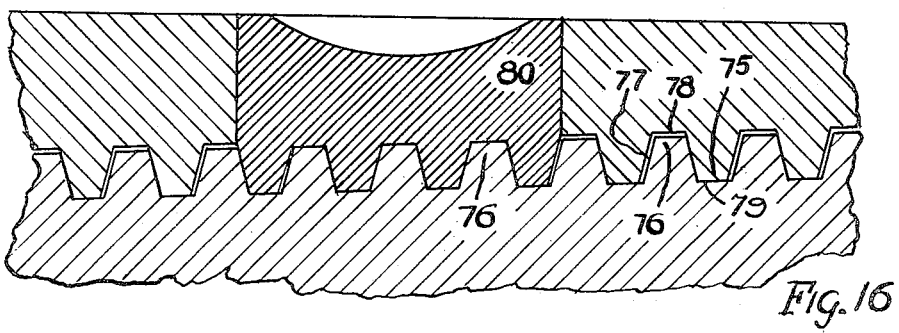
Figure 17:
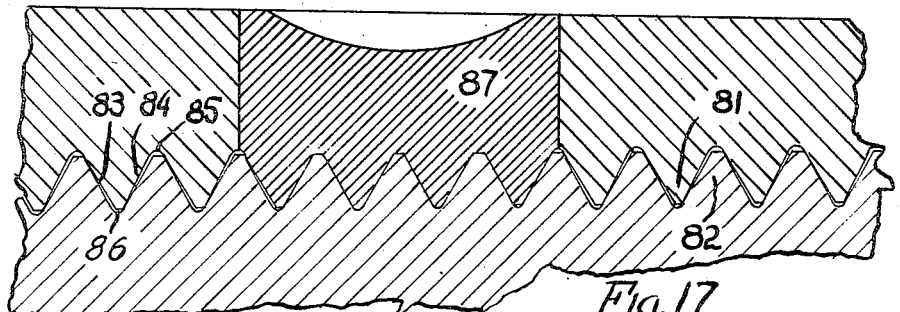
Figures 21, 22:
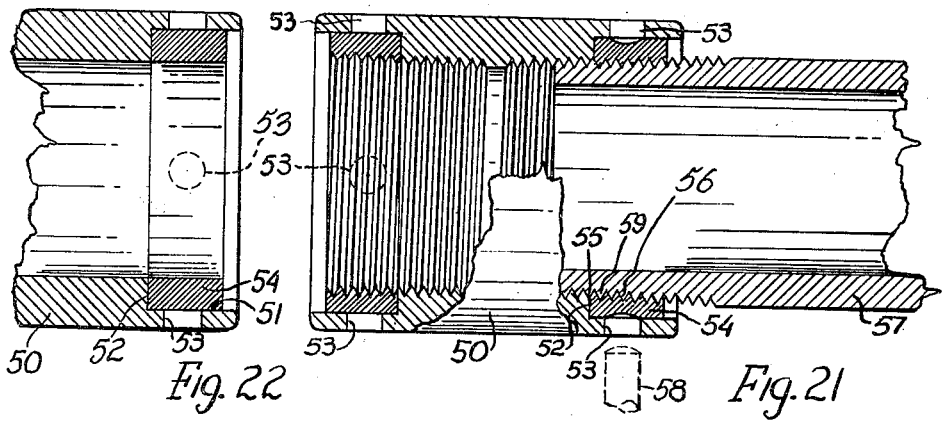
Figure 23:
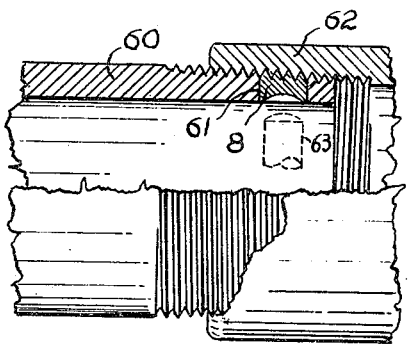
Figure 24:
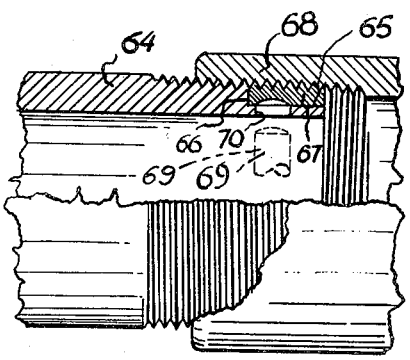

Figs. 15, 16, and 17 respectively are views generally similar to Fig. 6 but illustrating other and different types of thread at the threaded juncture;

Fig. 18 is a fragmentary view illustrating another way by which the process steps of Fig. 6 and Fig. 8 may be performed;

Figs. 19 and 20 illustrate two forms of a plug or insert element which I may employ in the threaded junctures illustrated in the preceding figures;

Fig. 21 is a view similar to Fig. 1 illustrating a modification of the coupling element of Fig. 1;

Fig. 22 is a fragmentary view of a part of Fig. 21 in the process of making it;

Figs. 23 and 24 are modifications illustrating another way to make a juncture of the type shown in Fig. 12.

Referring to Fig. 1 of the drawing, wherein is illustrated a threaded juncture of the sleeve coupling type, I have shown at 1 and 2, two pipes, tubes, casings, or the like, externally threaded at their ends as at 3 and 4, respectively, with male threads, of the tapering or conical class, screwed into corresponding internal or female threads 5 and 6 in the ends of a coupling sleeve 7. The three parts are screwed up tight together.

The mutually meshed threads have been made, or in any case may be made, to whatever degree

4 of accuracy is desirable within economically practicable limits, but as referred to hereinbefore, if fluid (gas or liquid) within the pipes 1 and 2 is subjected to high pressure, it will, in the absence of other provisions, leak out at the juncture from the inside of the pipes, by following the helical or spiral leakage or clearance path around and around and along the engaged threads, to the outside. In the juncture of Fig. 1 this leakage is prevented by means of inserts 8 and 9 in the wall of the coupling sleeve 7, moulded upon and fitting the threads 3 and 4 respectively, with an absolutely perfect fit, at a zone on a few convolutions of the thread, whereby this leakage path is completely blocked off and leakage prevented. These inserts 8 and 9 and the functions which they perform can best be described by describing the process by which they are provided, and this will now be given.

Figure 2:
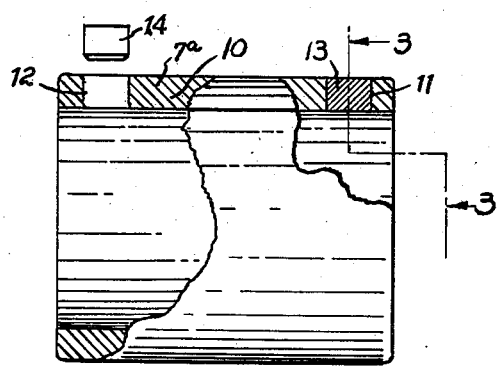
Fig. 2 is a longitudinal sectional view of the coupling element of Fig. 1 before it is threaded and illustrating steps of the process of making it.
Figure 3:
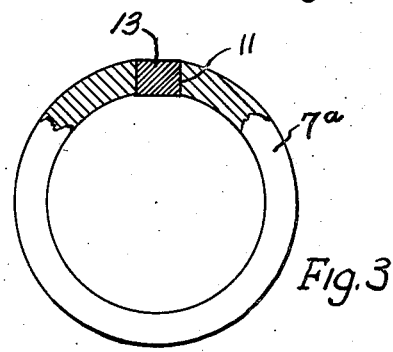
Fig. 3 is a cross sectional view taken from the plane 3—3 of Fig. 2.

The coupling sleeve, before it is threaded, appears as in Fig. 2 at 7a its tubular wall 10 being in general of the same thickness from end to end. Holes 11 and 12 are drilled or otherwise provided through the wall 10 preferably near the ends of the sleeve 7a and preferably radially as indicated in Figs. 2 and 3.

Fillers or plugs 13—14, later to become finished inserts, are made and pressed or driven into the holes 11 and 12. The plugs and the holes are sized relatively so that the plugs fit tightly in the holes without liability that they will rotate in the holes or be pushed outwardly in the holes when subsequent operations to be described are performed on them; and if desired, to further lock the plugs in the holes, the wall of the holes can be roughened if desired by any suitable tool or machine operations.

As to the material for the plug, I prefer to use a metal which is ductile or malleable for reasons which will become apparent and I have found that soft copper is entirely suitable and is preferred.

In Fig. 2, the plug 14 has been illustrated in a position ready to be pressed or driven into the hole 12 and the plug 13 is shown as already in the hole 11.

Figure 4:
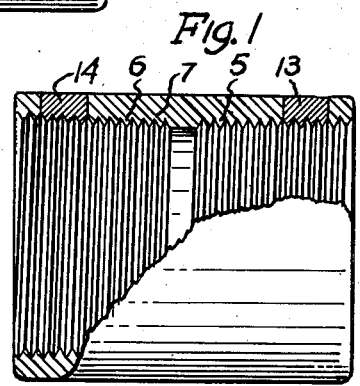
Fig. 4 is a longitudinal sectional view of the coupling element of Fig. 1 after the process step of threading it has been performed.

The coupling sleeve 7a with the plug therein is next threaded and will then appear as at 7 in Fig. 4 wherein it will be seen that several of the convolutions of the thread 5 are formed on the plug 13, and several convolutions of the thread 6 are formed on the plug 14. The two pipes or tubes 1 and 2 are next screwed into the threaded coupling 7, and drawn up tight.

Figure 5:
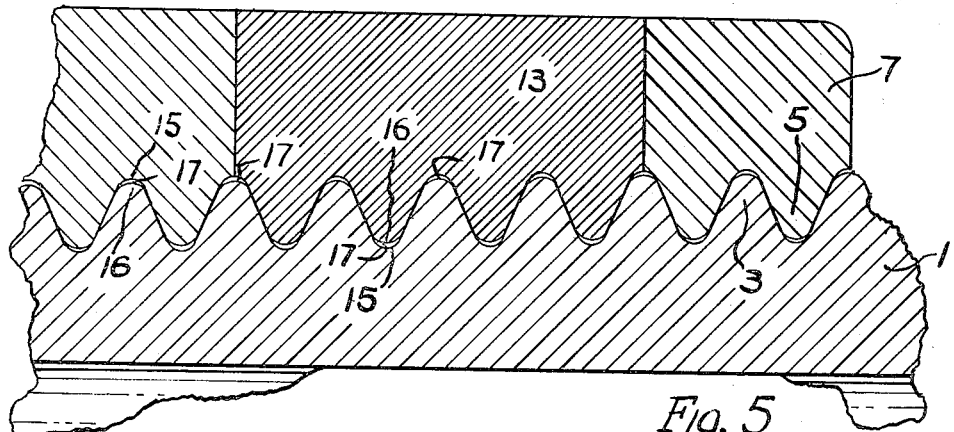
Figs. 5 and 6 are views to enlarged scale illustrating successive steps in the process of making the juncture of Fig. 1.

Reference may now be had to Fig. 5 wherein is shown to greatly magnified size the plug 13 in the sleeve 7, and in this figure is shown a part of the pipe 1. The threads 3 and 5 in Fig. 5 have been illustrated as of a type of thread used in the oil industry and being rounded at the crest of the thread and at the root as plainly shown in Fig. 5, inasmuch as one of the most important applications of the invention is to uses in the oil industry. Such threads can be accurately made and be in substantial contact with each other on the flanks of the thread which are made approximately at an angle of 60°.

Such threads are probably as accurately made as it is possible to make threads, but in order that threaded parts so made may be interchangeable, and because it is not economically possible to make the crest of one thread fit and contact with the root of another, and to avoid the liability that the crests and roots may bind on each other before the flanks of the threads have been drawn tight together, some clearance has to be left between the root of one thread as at 15 and the crest of the other thread as at 16; but this inevitably and unavoidably leaves the aforementioned spiral leakage passage in this clearance space, which clearance space is identified in the drawing by the reference character 17. (These rounded tips and crests of the teeth have not been shown in Fig. 4 because of the smaller scale of the drawing in that figure.)

It will be noted in Fig. 5 that this clearance space 17 will be present at all of the roots and crests of the threads on the coupling sleeve 7, the pipe 1 and the plug 13.

The next step of process is shown in Fig. 6 where the parts of Fig. 5 have been reproduced. The assembled coupling sleeve 7 and pipe 1 are supported in any suitable support or jig for example the support 18 in Fig. 8. By means of a hydraulic or other type of press, a tool 19, see Figs. 6 and 8, is forced down upon the outer exposed surface of the plug 13. The lower end of the tool 19 is preferably convexly rounded as at 20, and as it is forced downwardly it forges or draws or mashes the material of the plug. Because of the shape of the end 20 of the tool, the greater part of the pressure is applied at the center of the plug and forms a convex dent 21 in the plug. The material of the plug will be thereby spread laterally into and forced into intimate sealing contact with the wall of the hole 11 contributing to the seal thereat; and the inner portions of the plug on which the thread was formed will be moulded by the pressure into intimate sealing contact with the thread 3 of the pipe 1. The metal in the innermost parts of the plug will therefore be moulded by the pressure upon the profile of the convolutions of the thread 3 on the pipe at the center of the plug and for one or more convolutions of the thread on each side of the center. The above mentioned clearance space 17 will thereby be filled up and eliminated as at 22—22. At the sides of the plug where the pressure and the deformation of the metal is less, the clearance space may merely be made less as indicated at 23—23 in Fig. 6. The plug after it has been deformed, and appearing to smaller scale in Fig. 1, may now be identified by the reference character 8.

Figure 7:
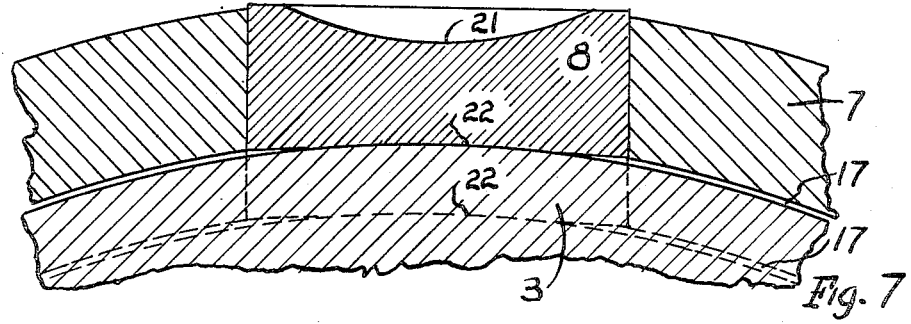
Fig. 7 is a sectional view taken from the plane 7—7 of Fig. 6.

By reference to Figs. 6 and 7, it will be apparent that in the generally central portions of the insert or plug 8 it is pressure moulded upon the thread 3 of the pipe 1 into perfect and complete intimate contact therewith thus blocking off and sealing the clearance leakage passageway provided by the clearance space 17, for the purposes described.

Figs. 9 and 10 illustrate a threaded juncture which may be made by the above described process between two pipes, casings, or the like, one screwed directly into the other. In Fig. 9, the pipes 24 and 25 have respectively internal threads 26 and external threads 27 thereon, and preferably conical, and a plug or insert 8 is provided for the pipe 24 to render the threaded juncture pressure leakproof as described.

In Fig. 10, pipes 28 and 29 have a similar threaded juncture sealed by a plug 8.

It is believed that the application of the process to these forms, Figs. 9 and 10 will be clear without further discussion.

Figure 13:
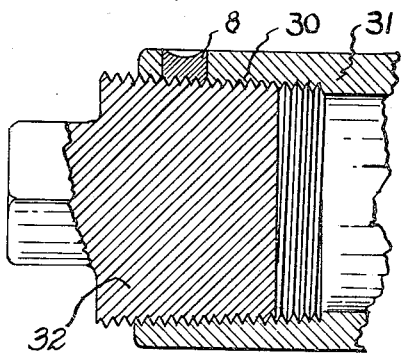
Figs. 13 and 14 illustrate, respectively, my invention applied to the threaded juncture between a pipe plug in the end of a pipe and a pipe cap on the end of a pipe.

In Fig. 13 is shown a plug 8 for sealing and rendering pressure leakproof the threaded juncture at 30 between a pipe 31 and a pipe plug 32 screwed thereinto to close the end of the pipe.

Figure 14:
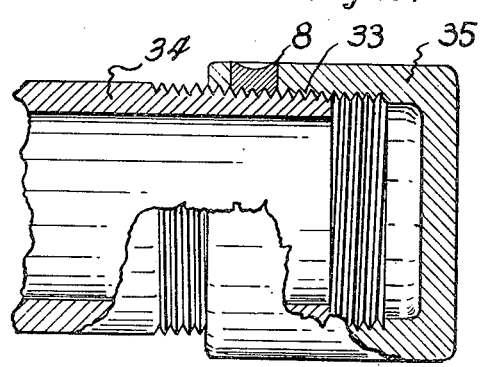

In Fig. 14 is shown a plug or insert 8 to seal the threaded juncture at 33 between a pipe 34 and a pipe cap 35 screwed on to the end of the pipe 34 to close the end of the pipe.

The process for providing the insert 8 in these forms will also be understood from the foregoing description.

The insert when in the form of a plug 14 and to be driven or pressed into the hole provided for it in the female element of the juncture as described above, may, as has been indicated, be a solid preferably cylindrical plug as shown at 14 in Fig. 19. In cases in which the element of the juncture into which the plug is pressed is relatively thick and a solid plug would not be sufficiently susceptible of being distorted by pressure, the plug may be made as in Fig. 20 wherein a cylindrical plug 36 has a recess 37 therein by which some of the metal is removed. The advantage of this form of plug, Fig. 20, is illustrated in Fig. 12, in which the pipe 38 has a relatively thick pipe flange 39 screwed thereon. The threaded juncture in this form is sealed by the above described process and in subjecting the plug 36 to pressure, the tool is inserted in the recess 37 and the metal between the thread and the bottom of the recess is moulded upon the thread of the pipe 38.

In Fig. 11 is shown a similar application of the invention. Here a valve housing 40 has a relatively thick walled boss 41 into which a pipe 42 is screwed and the threaded juncture is sealed by a plug 36.

In Fig. 18 is illustrated a modification of a step of the above described process which may be used to advantage when the female element of the juncture is relatively thick as in the forms of Fig. 11 and 12 for example. Here the internally threaded element 43 has a hole 44 drilled to receive the insert; and the outer part of the hole is threaded as at 45; and a screw 46 with a wrench-receiving end 47 for turning it, is screwed into the threaded hole. The lower end of the screw 46 is formed as at 48 to be the plug molding tool. After the pipe 49 is screwed into the element 43, and the threads are tightly engaged including the threads on the insert 8, the screw 46 is turned to forge or mold the plug upon the threads of the pipe 49, providing a sealing insert 8 as heretofore described.

In the above described embodiments of my invention, the opening or aperture in which the threaded insert is contained is in general a radial hole through the female member of the juncture; and the insert is in the general form of a plug filling this hole or aperture. As indicating the scope of my invention I have shown in Fig. 21 a modification in which a different form of aperture and different form of insert are provided. A tubular coupling element 50 is provided as in Fig. 22, having a preferably cylindrical aperture or recess 51 in the end thereof terminating inwardly at a shoulder 52. A radial hole is provided at 53 communicating with the recess. An annular insert of ductile metal which is preferably copper and shown at 54 is press fitted into the recess 51 and into engagement with the shoulder 52. Internal threads are then provided on the element 50 and on the insert as shown at 55 and 56 respectively in Fig. 21. The threaded male member 57 of the coupling is screwed into the thread 55 on the coupling element 50 and the thread 56 on the insert until the conical meshed threads come tight; and a press tool indicated at 58 is inserted in the hole 53, and by pressure, deforms the insert 54 and molds it sealedly against the thread 59 on the inner element 57 and against the shoulder 52.

A similar internal element may be screwed into the other end of the coupling 50 and sealed upon another male element in a similar manner.

As further illustrating the scope of my invention, I have shown in Figs. 23 and 24 modifications in which the insert deforming or molding pressure is applied to the insert from the inside instead of from the outside of the juncture as in the preceding forms.

In Fig. 23, the pipe 60 has a hole 61 drilled through its wall and an insert provided therein which will become the insert 8; and the pipe and the insert are externally threaded. A pipe, pipe flange, valve housing, or the like 62, internally threaded, is screwed on to the threads of the pipe and of the insert, and a pressure tool 63 of any suitable construction and operated by any suitable means, is forced upon the insert to mold and seal it upon the threads of the outer element 62 and upon the walls of the hole 61.

In Fig. 24, the male or inner element 64 before being threaded is turned down to smaller diameter at its end as at 65 and providing a shoulder 66 and a hole 70 is made therethrough; and an annular insert 67 is pressed over the turned down part and against the shoulder 66, and the pipe 64 and the insert are then externally threaded. The outer element 68 is screwed on to the inner element 64 and on to the insert 67, and a pressure tool 69, projected through the hole 70 molds the metal of the insert 67 against the threads of the outer part 68 and against the shoulder 66.

In the foregoing embodiments and modifications of my invention, the threads of the parts, being of relatively small scale in the drawing, may be considered as conventionally representing any type of thread, large scale magnified Figs. 5 and 6 illustrating one particular form to make the invention clear and to emphasize that even with a most accurately made thread, there is inevitably the said leakage pathway.

In Figs. 15, 16, and 17, however, are illustrated to comparatively large scale other types of thread to illustrate that the invention is applicable to all types of thread and to threads which fit accurately or inaccurately.

In Fig. 15, accurately made threads 71 and 72 of the V-type are made on the male and female threaded parts, but since it is not practicable to make such threads engage or fit each other at the crest and root, the aforesaid unavoidable clearance has been shown at 73; and the metal insert 74 has been shown as pressure-molded upon the thread 72 to eliminate or obliterate the clearance space particularly in the central portions of the insert.

In Fig. 16 is shown meshing threads of the Acme type and the female thread 75 is shown as not accurately fitting with the male thread 76. The threads may contact and fit each other on one flank but there may be, because of inaccuracy, clearance space at 77 on the other flank as well as clearance space 78 between the crest of the male thread and the root of the female thread, although the crest of the female thread and the root of the male thread may contact and fit as at 79, this kind of inaccurate fit being illustrative of inaccuracy which may occur. Nevertheless, the insert 80 as shown is pressure-molded perfectly upon the male thread 76 particularly at the central portions of the insert, and all leakage clearance is obliterated.

In Fig. 17, are shown a female thread 81 and a male thread 82 of the V-type, which contact or engage each other sufficiently well to support the pressure load thereon due to screwing them tightly together, but which fit each other inaccurately as shown by the clearance 83 and 84 on the flank and the clearance 85 and 86 at the crest and root. The insert 87 however obliterates all clearance, being pressure-molded upon the male thread 82 regardless of its inaccuracy.

From the foregoing illustrative examples therefore it is believed to be clear that no matter what the kind or degree of inaccuracy of the thread and spiral or helical clearance spaces therebetween which might otherwise provide a leakage path out of the juncture, the practice of my invention will block off such leakage path and prevent leakage.

Having made any of the pressure-leakproof threaded junctures illustrated and described above, the joined parts may be unscrewed from each other and thereby disassembled for transportation for the point of use and reassembled there, if that be desirable, and when reassembled the juncture will again be rendered leakproof by the perfect fit between the threads on the insert and the threads on the part which meshes with it.

From the foregoing it will be apparent that the invention may be practiced in making leakproof junctures between parts at the place where parts are manufactured and after which they may be taken apart or disassembled and shipped to the point of use and then reassembled into a leakproof juncture; or that the invention may be practiced at the place where the parts are joined together and the juncture rendered leakproof, and the parts in leakproof condition left assembled together. The invention therefore comprises not only the method for making a juncture leakproof but comprises a method of making parts which can go together in leakproof condition and comprises also parts so made that when they go together their juncture will be leakproof.

In the discussion of Figs. 2 and 3, it was stated that the plugs 13 and 14 would be pressed into their holes 11 and 12 to fit them sufficiently tightly so that there would be little liability that the plugs would rotate or be moved out of the holes during the process of threading them or thereafter, and that this might be effected by making the wall of the hole rough in any manner. In some cases it may be desirable to actually make the plug integral with the wall of the hole or aperture in which it is placed to seal it to the aperture wall and further insure against its displacement. This may be done by welding the plug in the aperture; or by brazing it therein; and inasmuch as this could be done by well known processes, for example by induction heating, it is deemed unnecessary to illustrate or further describe this step of the process. As an alternative, the wall of the aperture may be threaded with a tapered thread tap, and the plug similarly taper threaded and screwed in tight.

I have mentioned that copper is the preferred material for the aforesaid insert. Other metals of course may be used if sufficiently ductile or malleable to be molded by pressure upon the threads of the mating element. In some cases, materials other than metal such as plastic materials which retain their deformed shape may be used. As an alternative step of method of providing the threaded insert in intimate sealing contact with the walls of the retaining aperture, and with the thread upon which it is pressure-molded, molten metal may be utilized. In such a case, the parts of Figs. 1, 6, 7, 9, 10, 11, 12, 13, 14, 15, 16, 17, 21, 23, and 24 may be considered as illustrating this alternative process if the threaded inserts thereof are first considered as omitted. After the parts are screwed together as illustrated, but without the illustrated inserts, molten metal is poured into the recess or aperture, and it will flow into engagement with the wall of the aperture and will conform generally to the profile of the thread upon which it is molded, and will solidify. Then by means of pressure applied as hereinbefore described, the solidified plug may be deformed for the purposes described.

As an alternative to this molten metal process, solid metal may be placed in the recess or aperture and then heated by induction or other heating to melt it, to allow it to flow and solidify and be pressure-moulded as aforesaid.

In the drawing and in the description and for example in Fig. 1, only one insert 8 or 9 is provided around the circumference of the threads of the juncture. The effectiveness of the seal produced thereby will in most cases be sufficient with one insert. It is believed to be obvious however that a number of such inserts may be provided by exactly the same process, spaced around the circumference of the threaded juncture; and it is deemed to be unnecessary to illustrate and describe such modifications at length; but it has been indicated as contemplated hereby by the showing in Figs. 21 and 22, wherein the drawing indicates a number of holes 53 around the circumference of the thread whereat pressure by the tool 58 may be applied and whereby the insert will be pressure-molded into intimate sealing engagement with the inner threaded element at a number of points around the circumference.

It is believed that it will also now be apparent that the invention as described may be practiced with parts that are threaded on cylindrical surfaces instead of the conical surfaces illustrated.

My invention is not limited to the particular junctures illustrated and described and may be applied to other types of junctures; and my invention comprehends all additional modifications and all changes and modifications which may be made in the details of structure and of the process illustrated and described and which come within the scope of the appended claims.

I claim:

1. The method of making a pressure-leakproof threaded juncture between two walled conduit parts one of which is threaded and the other of which has a surface adapted to be threaded with a thread meshable with that of the one part; which includes: providing an aperture through the wall of the other part, the aperture having a circumscribing lateral aperture wall; and an axis generally radial to the said other part providing an insert of ductile material in the aperture having a first portion at the surface to be threaded of the said other part, and a second portion radially opposite the first portion; forming a thread on the said surface of the said other part and a part of the thread on the first portion of the insert; screwing the two parts together to mutually mesh their threads; applying pressure on the second portion of the insert in the general direction of the aperture axis to deform it and to cause it to flow and be permanently pressure-deformed transversely of the aperture into intimate sealing contact with the aperture wall while concurrently confining it in the aperture by the aperture wall, and to cause it to be permanently pressure-deformed longitudinally of the aperture into intimate sealing contact with the entire profile of the thread of the said one part with which it is meshed.

2. As an article of manufacture, two walled conduit parts screwed together; one part having a generally radial aperture through the wall thereof, the aperture having a circumscribing lateral aperture wall; and an insert of ductile material confined in the aperture by the aperture wall and transversely of the aperture being pressure-deformed into intimate pressure-contact with the aperture wall and effecting a seal thereon, and a longitudinal end of the insert being in intimate pressure-contact with the entire profile of the thread of the other part and effecting a seal thereon.

3. The method of making a threaded wall conduit part as an article of manufacture which includes: providing a surface adapted to be threaded on a wall of the part; providing an aperture through the wall of the part, the aperture having a circumscribing aperture wall and an axis generally radial to the part; providing an insert of ductile material in the aperture having a first portion at the surface to be threaded and a second portion radially opposite the first portion; forming a thread on the said surface of the part and a portion of the thread on the first portion of the insert; providing a mating threaded tool and screwing the tool and part together with the tool thread meshed with the thread on the part and on the insert; applying pressure on the second portion of the insert in the general direction of the aperture axis to deform it and to cause it to flow and be permanently pressure-deformed transversely into intimate sealing contact with the aperture wall while concurrently confining it laterally within the aperture by the aperture wall, and to cause it to be permanently pressure-deformed radially into intimate sealing contact with the entire profile of the tool thread with which it is meshed; and removing the tool by unscrewing it.

4. As an article of manufacture, a walled conduit part having a screw thread thereon and having a generally radial aperture through the wall, the aperture having a circumscribing lateral wall; and an insert of ductile material confined in the aperture by the aperture wall and transversely of the aperture being pressure-deformed into intimate pressure-contact with the aperture wall, and effecting a seal thereon, and a longitudinal end of the insert having a screw thread thereon continuous with the said thread on the said part.

JOHN THOMPSON.

REFERENCES CITED

The following references are of record in the file of this patent:

UNITED STATES PATENTS

| Number | Name | Date |
| --- | --- | --- |
| 503,433 | McIntyre | Aug. 15, 1893 |
| 1,880,115 | Smith | Sept. 27, 1932 |
| 2,072,591 | Lindquist | Mar. 2, 1937 |
| 2,087,185 | Dillon | July 13, 1937 |
| 2,284,260 | Castellanas | May 26, 1942 |
| 2,367,206 | Davis | Jan. 16, 1945 |

FOREIGN PATENTS

| Number | Country | Date |
| --- | --- | --- |
| 1,657 | Denmark | June 27, 1898 |